US012307845B2

(12) United States Patent
von Sydow

(10) Patent No.: US 12,307,845 B2
(45) Date of Patent: May 20, 2025

(54) GATE ARRAY, IN PARTICULAR FOR A PASSENGER TRANSPORT SYSTEM

(71) Applicant: Scheidt & Bachmann GmbH, Mönchengladbach (DE)

(72) Inventor: Thorsten von Sydow, Jülich (DE)

(73) Assignee: Scheidt & Bachmann GmbH, Mönchengladbach (DE)

(*) Notice: Subject to any disclaimer, the term of this patent is extended or adjusted under 35 U.S.C. 154(b) by 15 days.

(21) Appl. No.: 18/469,798

(22) Filed: Sep. 19, 2023

(65) Prior Publication Data

US 2024/0102335 A1 Mar. 28, 2024

(30) Foreign Application Priority Data

Sep. 27, 2022 (DE) .................... 10 2022 124 736.8

(51) Int. Cl.
*G07C 9/15* (2020.01)
*E06B 11/08* (2006.01)
(Continued)

(52) U.S. Cl.
CPC ................ *G07C 9/20* (2020.01); *G07C 9/10* (2020.01); *E05F 2015/763* (2015.01); *E05F 2015/767* (2015.01); *E05Y 2900/40* (2013.01)

(58) Field of Classification Search
CPC .......... E05F 2015/763; E05F 2015/767; G07B 15/04; G07B 15/00; E05Y 2900/40;
(Continued)

(56) References Cited

U.S. PATENT DOCUMENTS 6,617,960 B1 * 9/2003 Fischer .................... G07C 9/28 235/382
8,674,805 B2 * 3/2014 Charych .................. G07C 9/28 340/5.82

(Continued)

FOREIGN PATENT DOCUMENTS

CN 112 037 399 A 12/2020
DE 20 2019 104046 U1 10/2020

(Continued)

OTHER PUBLICATIONS

European Patent Office, Examination Report, Application No. 23196167.3, dated Feb. 23, 2023, 9 pages (in German).

(Continued)

*Primary Examiner* — Dionne Pendleton
(74) *Attorney, Agent, or Firm* — Sunstein LLP

(57) ABSTRACT

A gate array includes at least two access control gates and a monitoring system with at least a first sensor equipment at least configured to detect a user in a first access area of the first access control gate and to detect a user in a second access area of the second access control gate. At least one detection device detects an assignment error state at least if, upon a detection of the ticket medium by a first reader module of the first access control gate, a user is detected at least almost simultaneously by the first sensor equipment (Continued)

only in the second access area. At least one control device is configured to initiate at least one assignment error action upon a detection of the assignment error state.

17 Claims, 6 Drawing Sheets

(51) Int. Cl.

| | |
|---|---|
| ***G07C 9/10*** | (2020.01) |
| ***G07C 9/20*** | (2020.01) |
| *E05F 15/73* | (2015.01) |

(58) Field of Classification Search

CPC ... G07C 9/10; G07C 9/20; G07C 9/28; G07C 9/00; G07C 9/00896; G07C 9/00944; G07C 9/15; G07C 9/257; E06B 11/08; H01Q 1/2216; H01Q 7/00; H04N 7/188; H04B 5/77; G06Q 10/02; G06Q 20/204; G06Q 20/325; G06Q 20/326; G06Q 20/3278; G06Q 50/10; G06K 7/10297; G06K 7/10306; E04H 1/1227; G06V 20/52; G06V 40/00; G06V 40/10; G06V 40/23

See application file for complete search history.

(56) References Cited

U.S. PATENT DOCUMENTS

| | | | | |
|---|---|---|---|---|
| 2010/0117785 | A1 | 5/2010 | Miller et al. | |
| 2011/0100405 | A1* | 5/2011 | Fournier | E04H 1/1227 235/382 |
| 2021/0375083 | A1* | 12/2021 | Vilhelmsen | G07C 9/00944 |
| 2023/0325807 | A1 | 10/2023 | Suzuki | |

FOREIGN PATENT DOCUMENTS

| | | | |
|---|---|---|---|
| WO | 2010/078856 | A1 | 7/2010 |
| WO | 2022/054574 | A1 | 3/2022 |

OTHER PUBLICATIONS

German Patent Office, Office Action, Application No. 10 2022 124 736.8, mailed Apr. 21, 2023, 7 pages (in German).

* cited by examiner

GATE ARRAY, IN PARTICULAR FOR A PASSENGER TRANSPORT SYSTEM

CROSS-REFERENCE TO RELATED APPLICATIONS

This application claims the benefit of German patent application No. 10 2022 124 736.8, filed Sep. 27, 2022, the disclosures of which are incorporated herein by reference in their entirety.

TECHNICAL FIELD

The application relates to a gate array, in particular for a passenger transport system, with at least two access control gates. Furthermore, the application relates to a method and a passenger transport system.

BACKGROUND ART

Access control systems and gate arrays, respectively, for controlling an access from an uncontrolled area to a controlled area and/or in the reverse direction are used, for example, in passenger transport systems.

A present passenger transport system, in particular a public passenger transport system, serves to transport persons and users, respectively, by means of passenger transport vehicles (hereinafter referred to as transport vehicles). Exemplary and non-exhaustive transport vehicles of a passenger transport system are rail vehicles (e.g., suburban train, subway, streetcar etc.), motor vehicles (e.g., bus), but also water vehicles (e.g., ferry) and airplanes. However, gate arrays are also used in other applications where an authorization of users to enter or leave a controlled area is to be controlled, such as at sports, cultural or recreational events.

In the present application, a gate array comprises at least two access control gates. An access control gate is configured to selectively block and to selectively enable letting in (i.e., in particular, entering) from a first area to a second area. An access control gate can in particular ensure that only authorized respectively permitted users can pass through the access control gate, for example to enter the controlled area and/or to leave the controlled area.

A gate array is configured to check a ticket medium of a user respectively the access authorization of the user provided thereon, prior to a release of a passing of a access control gate. A user may have a ticket medium with an access authorization (e.g., a ticket code, such as a magnetic stripe code, graphical ticket code, such as a bar code or QR code, RFID identifier, another readable user identifier or mobile device identifier, etc.) readable by a reader module. The ticket code may contain as data content at least the user's access authorization and/or an identification of the user that can be used to verify the access authorization.

In an initial state, an access control gate is usually blocked. This means that a barrier element of the access control gate physically prevents a user from passing through the access control gate. In other cases, the access control gate may be open in the initial state and close only when a user without a valid access authorization and a ticket medium, respectively, attempts to pass through the access control gate.

Furthermore, access control gates are known which do not require any barrier elements and which signal a going through only optically. Without limiting the generality, it is assumed in the following that an access control gate is blocked in the initial state and is opened for the going through of the user upon a positive validation verification of the ticket medium of a user.

An access control gate may have at least one reader module and ticket detection device, respectively. Known reader modules comprise optical reader modules, in particular configured to detect images of a graphical ticket code (e.g., barcode or QR code) of a ticket medium in a detection area of the reader module, as well as reader modules for magnetic stripe tickets, smart card-based tickets (NFC), tickets on mobile devices, etc. In other words, it is generally necessary for a user to hold the ticket medium in the detection range of a reader module in such a way that the reader module can read the user authorization of the ticket medium.

FIG. 1*a* shows a schematic (top) view of an exemplary gate array 100 of the prior art in an error-free assignment state.

According to the application, an error-free assignment state means in particular that a user 113 holds his ticket medium 118 at that reader module 111, 112 which is assigned to the access control gate 101, 102 in whose access area 119, 120 the user 113 is located during the presentation of the ticket medium 118 to the reader module 111, 112. Holding the ticket medium 118 to the reader module 111, 112 may be referred to in particular as tapping.

The shown gate array 100 comprises a first access control gate 101 and a second access control gate 102 arranged adjacent to the first access control gate 101.

The first access control gate 101 comprises a first gate body 103 (elongated in shape) and a second gate body 104 (elongated in shape) arranged adjacent (in particular parallel) to the first gate body 103. The first gate body 103 and the second gate body 104 define a first aisle 107, presently from a controlled area 114 to an uncontrolled area 115.

Furthermore, the first access control gate 101 comprises at least one first barrier element 109. In the present case, two first barrier elements 109 are provided. The at least one first barrier element 109 is movable between an open position and a closed position by at least one first actuator 116 (in the present case also two first actuators 116).

In the open position, in which the at least one first barrier element 109 is arranged by way of example in FIG. 1*a*, the aisle 107 through the first access control gate 101 is released and a passage is possible, respectively.

The second gate body 104 of the first access control gate 101 comprises at least one first reader module 111. The first reader module 111 is configured to detect a ticket medium 118 held by a user 113 within (reading) range of the first reader module 111. As has already been described, the at least one first actuator 116 is configured to move the first barrier element 109 at least based on a validation verification of the detected ticket medium 118.

In particular, if the validation verification result is positive, i.e., if it has been determined that the ticket medium 118 is a valid ticket medium respectively contains a valid access authorization, the first access control gate 101 may be released by moving the at least one barrier element 109 to the open position. In the case of a negative validation verification result, i.e., if it has been determined that the ticket medium 118 is an invalid ticket medium respectively does not contain a valid access authorization, the first access control gate 101 may remain blocked by holding the at least one barrier element 109 in the closed and blocked position, respectively.

In front of the first access control gate 101 is an access area 119 that must be passed, in particular, by a user 113 who wishes to respectively will pass through the first access control gate 101.

The second access control gate 102 comprises a third gate body 105 (elongated in shape) and a fourth gate body 106 arranged adjacent (in particular parallel) to the third gate body 105. The third gate body 105 and the fourth gate body 106 define a second aisle 108 from the uncontrolled area 114 to the controlled area 115.

Further, the second access control gate 102 comprises at least one second barrier element 110. In the present case, two second barrier elements 110 are provided. The at least one second barrier element 110 is movable between an open position and a closed position by at least one second actuator 117 (in the present case also two second actuators 117). In the closed position, in which the at least one second barrier element 110 is located by way of example in FIG. 1*a*, the aisle 108 through the second access control gate 102 is blocked and a passage is not possible, respectively.

The fourth gate body 106 comprises at least one second reader module 112 configured to capture a ticket medium 118 held by a user 113 within (reading) range of the second reader module 112. The at least one second actuator 117 is configured to move the second barrier element 110 at least based on a validation verification of the captured ticket medium 118. In particular, the second access control gate 102 may be released or remain blocked in accordance with the first access control gate 101.

In front of the second access control gate 102 is an access area 120 that must, in particular, be passed by a user 113 who wishes to respectively will go through the first access control gate 102.

Presently, it can be seen that the second gate body 104 of the first access control gate 101 is also and forms, respectively, the third gate body 105 of the second access control gate 102.

In the error-free assignment state shown in FIG. 1*a*, the user 113 presents the ticket medium 118 to the (ticket) reader module 111 that is on the right side of the aisle 107 that the user 113 wishes to use, as viewed in the passage direction. Typically, the user 113 will present the ticket medium 118 with his right hand, as shown. It shall be understood that in other variants of the application, the correct reader module may be located on the other side of an aisle in each case.

In the example shown in FIG. 1*a*, the ticket medium 118 is a valid ticket medium 118 such that the first barrier element 109 is/will be opened, as shown.

In FIG. 1*b*, a schematic (top) view of the exemplary gate array 100 of the prior art of FIG. 1*a* is shown in an error assignment state.

According to the application, an assignment error state means in particular that a user 113 holds his ticket medium 118 at that reader module 111, 112 which is not assigned to the access control gate 101, 102 in whose access area 119, 120 the user 113 is located during the presentation of the ticket medium 118 at the reader module 111, 112.

As presently shown, the user 113 presents the ticket medium 118 at the reader module 111 assigned to the first access control gate 101. However, the user himself is in front of the second access control gate 102. In the example according to FIG. 1*b*, the ticket medium 118 is a valid ticket medium 118, so that the first barrier element 109 of the first access control gate is/will be opened, as shown.

In particular, FIG. 1*b* shows a situation in which a user 113 (e.g., a left-handed person or a user 113 carrying something in his or her right hand, such as a piece of luggage) presents the ticket medium 118 to the reader module 111 and validation target 111, respectively, to which the user 113 is not oriented to respectively assigned with respect to the aisle 108. This situation and erroneous operational process, respectively, may also be referred to as left-hand tapping. The expectation of the user 113 is that the barrier elements 110 of the second passage block 102 in front of him will open. In fact, the barrier elements 109 of the first access control gate 101 open which are located to the left of the user 113 in the illustration.

It has been recognized that an assignment error state and the described situation, respectively, in which a user makes an erroneous assignment of reader module respectively of validation target and aisle respectively of access control gate occurs in practice in particular under the following general conditions:

In particular, the user is an infrequent user of gate arrays with little or no experience. The user is not familiar with the gate array. In contrast, a user who passes the gate array frequently (e.g., a commuter) usually knows how to pass the gate array as quickly as possible. In particular, this user is aware of which reader module belongs to which access control gate.

Additionally, it has been found that an assignment error state often occurs when a low volume of users can be observed at the gate array. If there are many other users at the gate array, it can be learned by observation which reader module is assigned to which access control gate.

It was also found that an assignment error state frequently occurs for users who are left-handed. Presumably, it is intuitive for a significant number of left-handers to hold the ticket medium in their left hand and consequently to guide it to the reader module with their left hand. Due to the stretched left arm, the attention area is rather oriented to the right by the associated body position, so that it may not be perceived that the access control gate located on the left opens. The perceived failure leads to the fact that if necessary a new attempt is made at a neighboring reader module located on the right. This behavior could be observed at gate arrays in practice.

Furthermore, it was recognized that an assignment error state often occurs when a user has both hands in use. In practice, it was observed at gate arrays that users take the ticket medium in their left hand in case the right hand is already in use (e.g., to hold a bag, a mobile device, etc.) and sometimes then correspondingly head for the wrong reader module with the expectation that the access control gate in front of them will open.

Various problems/disadvantages can result from an assignment error state and the previously described situation, respectively.

Thus, this can lead to a security problem, since another user may possibly use the released access control gate without authorization. In particular, the gate array can be passed at the expense of the user who assumed an erroneous assignment of reader module to access control gate.

In the event that a value is stored on the ticket medium (also known as a stored value ticket), the charge required for the passage is deducted without the user actually having used the passage. In the case of several successive incorrect attempts, this may even occur several times depending on the system.

In so-called identification-based respectively ID-based systems (e.g., for ticket media in the form of monthly tickets), a so-called anti-passback function can be implemented in the access control system. This function is intended to prevent a ticket medium from being passed back after a first passage through the gate array by a first user to the other side of a gate array to another user, who may then also use the ticket medium for passage. Accordingly, in such a system, a specific dead time (e.g., 10 minutes) may be predetermined. This dead time starts after a (positive) validation verification of the ticket medium respectively it is verified whether the detected identifier has already been used within a specific previous time period, namely the dead time. Only after this dead time has expired this ticket medium can be used again. A previous usage attempt leads to a negative verification result so that a corresponding access control gate and the entire gate array, respectively, remains blocked.

In the case of the described assignment error state, this leads to the fact that even if the user has recognized his/her incorrect operation, he/she has to wait a time (namely the mentioned dead time) until the next possible validation and passage. Since the existence of this dead time and the length of the dead time are usually unknown to users, the user often cannot resolve the situation without help. This significantly reduces the usability of the gate array.

From a cost perspective, the described assignment error states also lead to problems, as the deployment of service personnel at the gate arrays is required to resolve an assignment error state in the interests of the user. If an annoyance of a user resulting from the problems becomes public, e.g., via social media, passenger associations, etc., this may lead to damage to the image of the operator of the passenger transportation system, which in turn would require costly responses.

In addition, an assignment error state and left-hand tapping, respectively, results in reduced throughput at a gate array. Thus, in particular during peak times, an assignment error state at a gate array can lead to obstructions in the flow of users.

In order to solve these problems, passive measures are known from the prior art that aim to make it easier for the user to correctly assign the reader module and validation target, respectively, and the access control gate and the aisle, respectively, visually or by geometric alignment of the reader module. For example, it is known from the prior art to tilt the reader module respectively a surface of the reader module in the direction of the assigned access control gate. Also known is the arrangement of symbols and/or colors at the gate array, such as green arrows pointing from the reader module to the access control gate assigned to that reader module.

However, the practice shows that, despite these passive measures, users regularly make incorrect assignments of reader module and access control gate. Therefore, the aforementioned problems regarding security, throughput, usability and costs continue to occur in the prior art.

SUMMARY OF THE INVENTION

A gate array, according to embodiments of the invention, serves in particular for an application in a passenger transport system. The gate array comprises a first access control gate having a first gate body and a second gate body arranged adjacent to the first gate body. The first gate body and the second gate body define and form, respectively, a first aisle between a controlled area and an uncontrolled area. The first access control gate comprises at least one first barrier element movable between an open position and a closed position by at least one first actuator. The second gate body comprises at least a first reader module. The first reader module is configured to capture a ticket medium held by a user within reach and the detection range, respectively, of the first reader module. The at least one first actuator is configured to move the first barrier element between the open position and the closed position at least based on a validation verification of the captured ticket medium. The gate array comprises at least one second access control gate having a third gate body and a fourth gate body arranged adjacent to the third gate body. The third gate body and the fourth gate body define and form, respectively, a second aisle between the controlled area and the uncontrolled area. The second access control gate comprises at least one second barrier element movable between an open position and a closed position by at least one second actuator. The fourth gate body comprises at least one second reader module. The second reader module is configured to capture a ticket medium held by a user within reach and the detection range, respectively, of the second reader module. The at least one second actuator is configured to move the second barrier element between the open position and the closed position at least based on a validation verification of the captured ticket medium. The second gate body of the first access control gate is the third gate body respectively forms the third gate body of the second access control gate.

The gate array further comprises a monitoring system. The monitoring system comprises at least one first sensor equipment. The first sensor equipment is at least configured to detect a user in a first access area of the first access control gate and to detect a user in a second access area of the second access control gate. The monitoring system comprises at least one detection device. The detection device is configured to detect an assignment error state at least if during a capturing of a ticket medium by the first reader module of the first access control gate a user is detected at least almost simultaneously by the first sensor equipment only in the second access area. The monitoring system comprises at least one control device. The control device is configured to initiate at least one assignment error action upon a detection of the assignment error state.

In that, in contrast to the prior art, the gate array according to the application comprises an active monitoring system which is configured to detect an assignment error state and is configured to at least initiate an assignment error action upon a corresponding detection, the problems described above are at least reduced and, in particular, the security, throughput and usability of a gate array, in particular of a passenger transport system, are improved. Costs can be reduced. In particular, according to the application, an active monitoring system is provided instead of passive measures by which an assignment error state can be eliminated by at least one active assignment error action.

The gate array according to the application is preferably used in a passenger transport system, in particular to separate a controlled area of the passenger transport system from an uncontrolled area of the passenger transport system. A passenger transport system according to the application is in particular a public passenger transport system and serves to transport persons and users, respectively, by means of passenger transport vehicles (hereinafter referred to as transport vehicles). Exemplary and non-exhaustive transport vehicles are rail vehicles (e.g., train, subway, streetcar etc.), motor vehicles (e.g., bus), but also water vehicles (e.g., ferry) and aircrafts.

The gate array according to the application comprises at least two access control gates and gates, respectively, which are arranged in particular adjacent to each other. It shall be understood that in variants of the application, a gate array may comprise three or more (adjacent) access control gates.

Each access control gate comprises two gate bodies. Two access control gates arranged adjacent to each other (always) share one gate body. A gate body is in particular a base of a gate array extending in the direction of passage. The two gate bodies of an access control gate are in particular arranged parallel to each other. The area between the gate bodies, which is defined and formed, respectively, by the gate bodies, is in particular an aisle from the controlled area to the uncontrolled area and/or from the uncontrolled area to the controlled area. In particular, the two gate bodies of an access control gate form the lateral boundary of the aisle of this access control gate.

A gate array according to the application may in particular be arranged at an entrance and/or exit of a controlled area. The controlled area may, in particular, require a user's access authorization and/or stay authorization for access and/or stay. In particular, the gate array according to the application may be used in a public transport access control system but also in other access applications.

Each access control gate comprises at least one reader module for each intended passage direction for which the passage of a user is to be controlled. The at least one reader module is arranged in respectively on a (specific) gate body of the (respective) access control gate. For example, the respective gate body of a respective access control gate arranged on the right side in the passage direction may comprise the reader module (in particular, in the area of the front side). According to the application, the second gate body of the first access control gate comprises the at least one first reader module of the first access control gate and the fourth gate body of the second access control gate comprises the at least one second reader module of the second access control gate. It shall be understood that each access control gate may have two or more reader modules (based on different technologies) each of which may be arranged in the same gate body.

The at least one reader module of an access control gate may be at least one interface device, such as a Bluetooth reader module, RFID reader module, NFC reader module, WLAN reader module, optical reader module, magnetic stripe scanner, etc.

Preferably, the at least one reader module of an access control gate can be an NFC reader module and/or an optical reader module (e.g., barcode scanner or QR code scanner) configured to capture a ticket code of a ticket medium held in the detection area and the range of the reader module, respectively. The range of a reader module, in particular in the case of an NFC reader module and/or an optical reader module, can be between nearly 0 and 20 cm, in particular between nearly 0 and 10 cm.

The ticket medium can be a mobile terminal on which a ticket code (containing at least one access authorization as data content) can be stored in a readable manner. For example, a ticket code can be displayed on the display of the mobile terminal. Alternatively or additionally, a stored ticket code can be readable via an NFC interface of the mobile terminal.

Exemplary and non-exhaustive mobile devices comprise smartphones, tablet computers, mobile gaming consoles, laptops, netbooks, smartwatches, and similar wearables.

The ticket medium is not limited to a mobile terminal, however, it can also be another ticket medium, such as a paper-based or card-based ticket medium, for example with a graphic ticket code located on an outer surface, in particular printed on it, or with a magnetic strip. Exemplary other ticket media that can be captured in particular by a reader module in a contactless or contact-based manner are tokens, chip cards (respectively smart cards), credit cards, bank cards (or the like), cell phones, personal digital assistants (PDAs), tablet PCs, integrated circuit chips, electronic passports, electronic ID documents, etc.

Each access control gate comprises at least one barrier element. In particular, at least one barrier element may be attached to at least one gate body of a (respective) access control gate.

In particular, each access control gate may comprise at least one (controllable) actuator (e.g., an electric motor) configured to move the barrier element between an open position and a closed position of the access control gate. In the open position, the passage through the access control gate is released. In the closed position, the passage is (physically) blocked by the barrier element arrangement of the access control gate.

In general, an access control gate according to the application is configured to release a passing of the access control gate if a ticket medium (respectively ticket code of the ticket medium) captured by a reader module of this access control gate authorizes the user of the ticket medium to pass the access control gate. For example, the gate array and/or a further device (e.g., background system) of the passenger transport system may comprise at least one validation module configured to evaluate the captured ticket medium. In particular, the validation module may perform a comparison of an access authorization contained in a ticket code of the captured ticket medium with stored authorized access authorizations or non-authorized access authorizations.

If the evaluation results in an authorization of the user to pass the corresponding access control gate, i.e., if the validation verification result is positive, the validation module can generate a release signal. Upon receiving the release signal, the at least one actuator of the corresponding access control gate can cause a moving of the at least one barrier element of the corresponding access control gate to the open position so that the user can pass the corresponding access control gate. If the evaluation shows that the user is not authorized to pass the access control gate, i.e., if the validation verification result is negative, the access control gate can remain blocked.

In a known mode of operation, an access control gate can only be operated in one passage direction, i.e., in a specific passage direction state. In particular, this means that users can only pass through an access control gate in one direction (as intended). For example, in this operating state, the access control gate can only allow entering into the controlled area or only allow exiting from the controlled area.

However, in another mode of operation, the passage direction of an access control gate and the passage direction state, respectively, may be changed during operation to provide, for example, passing of the access control gate in a first passage direction during a first time period and passing of the access control gate in the opposite passage direction during another time period. In this case, the access control gate comprises reader modules at both ends of the aisle such that they are typically located to the right of the aisle in the user's direction of passage.

As described above, in general, the first access control gate releases a passage through the first access control gate if a ticket medium captured by the at least one first reader module authorizes the user to pass, and the second access control gate releases a passage through the second access control gate if a ticket medium captured by the at least one second reader module authorizes the user to pass. In both cases, a previously described error-free assignment state exists (respectively this is assumed).

As described at the beginning, an assignment error state and assignment error situation, respectively, may occur at a gate array according to the application. An assignment error state means, in particular, that a user holds his ticket medium to the reader module that is not assigned to the access control gate in whose access area the user is located during the presentation of the ticket medium to the reader module.

The first access control gate is assigned to a first access area arranged in front of the first barrier element in the direction of passage and arranged adjacent to the first reader module, wherein the first access area must be passed by a user who wants to respectively will pass through the first aisle of the first access control gate. The second access control gate is assigned to a second access area arranged in front of the second barrier element in the passage direction and arranged adjacent to the second reader module, wherein the second access area must be passed by a user who wants to respectively will pass the second access control gate through the second aisle. In particular, the first access area is the area in which a user holding the ticket medium within range of the first reader module and wishing to pass the first access control gate must be located. In particular, the second access area is the area in which a user who holds the ticket medium within range of the second reader module and who wishes to pass the second access control gate must be located. Each further access control gate can be assigned an access area in a corresponding manner.

According to the application, the gate array, in particular the monitoring system, comprises a first sensor equipment (e.g., comprising one or more sensor modules) at least configured to detect a user in the first access area of the first access control gate and to detect a user in the second access area of the second access control gate. In other words, the first sensor equipment may detect whether one or more users are in the first access area and/or in the second access area.

Furthermore, the gate array, in particular the monitoring system, comprises a detection device configured to detect an (described) assignment error state. An assignment error state is detected respectively determined at least (for example, only) if, during respectively immediately after and/or before (between 0 and 5 s, preferably between 0.5 and 2.5 s thereafter and/or before) a capturing of the ticket medium (respectively the ticket code contained therein) by the first reader module of the first access control gate, a user is detected by the first sensor equipment only in the second access area (and, in particular, no user is detected in the first access area).

It has been shown that a corresponding detection pattern (practically simultaneously detection of a ticket medium by first reader module of the first access control gate, of a single user standing in the access area in front of the (adjacent) second access control gate and of a free access area in front of the first access control gate) is a reliable criterion for the presence of an assignment error state.

According to the application, the gate array, in particular the monitoring system, comprises a control device configured to initiate at least one assignment error action upon a detection of the assignment error state. The assignment error action is, in particular, an (active) action aimed for (promptly) eliminating the assignment error state.

According to one embodiment of the gate array according to the application the gate array comprises at least one (controllable) optical display. Upon a detection of the assignment error state, the control device may be configured to control the optical display such that graphical misassignment information is displayed on the optical display. In particular, a controlling of the optical display can be performed immediately after a detection of the assignment error state.

A misassignment information may in particular contain an information piece about the presence of an assignment error state. Preferably, the misassignment information may (additionally) comprise at least one instruction for action to eliminate the assignment error state (e.g., an arrow pointing to the opened first access control gate and/or a text with the instruction to use the first access control gate and/or a color coding that the second access control gate is blocked (e.g., red) and the first access control gate is opened (e.g., green)). It shall be understood that a plurality of visual indicators may be provided.

The at least one optical display controlled by the control device is in particular the optical display to which the user's gaze is directed on the basis of his detected position (second access area).

Alternatively or preferably additionally, the gate array may comprise at least one acoustic interface (e.g. at least one loudspeaker). Upon a detection of the assignment error state, the control device can be configured to control the acoustic interface in such a way that an acoustic misassignment information is output by the acoustic interface.

In particular, a controlling of the acoustic interface can occur immediately after a detection of the assignment error state. As has already been described, a misassignment information may in particular contain an information piece about the presence of an assignment error state. Preferably, the misassignment information may (additionally) comprise at least one instruction for action to eliminate the assignment error state (e.g., a specific tone/sound sequence and/or an announcement with instructions to use the first access control gate). It shall be understood that a plurality of audible interfaces may be provided.

The at least one acoustic interface controlled by the control device is in particular the acoustic interface to which the user is directed based on his detected position (second access area).

Furthermore, the gate array may alternatively or additionally comprise at least one vibration module. Upon a detection of the assignment error state, the control device may be configured to (directly) control the vibration module such that a haptic signal is output by the vibration module. For example, a reader module may comprise the vibration module. For example, the reader module (e.g., an NFC reader module or an optical reader module) may be a support reader module having a support surface on which the ticket medium must be placed to enable a capturing of the ticket medium respectively the respective ticket code. In particular, the vibration module may be configured to vibrate the support surface. For example, the vibration module may output a haptic signal and vibration signal, respectively, depending on a control signal, in particular to the support surface to inform the user of the presence of an assignment error state. By means of the support surface, the vibration signal can be transmitted in particular to the ticket medium and a hand of the user. In a simple manner, the user experiences feedback.

In particular, the above means can be combined with each other. In a simple way, an assignment error state can be eliminated.

According to a preferred embodiment of the gate array according to the application, upon a detection of the assignment error state, the control device may be configured to control the first actuator in such a way that a moving of the at least one first barrier element into the open position is prevented (although there is a positive validation result for this access control gate). The controlling of the first actuator (this may also comprise a stopping of controlling the first actuator) may preferably be performed immediately after a detection of the assignment error state. In particular, this can further improve security. Thus, it can be prevented that an unauthorized user can use the opened first access control gate to pass the gate array.

According to a particularly preferred embodiment of the gate array according to the application, upon a detection of the assignment error state, the control device may be configured to control the second actuator such that a moving of the at least one second barrier element into the open position is caused. In particular, the gate array is configured such that a ticket medium captured by a first reader module assigned to the first access control gate can, in principle, cause a releasing of a passing of the second (adjacently arranged) access control gate, namely at least if an assignment error state is detected.

Based on the detected assignment error state, the at least one second barrier element can be opened (while in particular additionally the at least one first barrier element can remain blocked). In a particularly user-friendly and safe manner, an assignment error state can be (actively) eliminated.

However, in order to prevent an assignment error state from repeatedly occurring to a user because a user thinks that his operating behavior was correct after passing the second access control gate, even though the user used the wrong reader module, it is proposed to make the user aware of the detected assignment error state. According to one embodiment, the control device may be configured to control the second actuator such that a moving of the at least one second barrier element to the open position is caused with an error speed, wherein the error speed is less than a normal opening speed. In other words, the at least one second barrier element may be opened more slowly upon a detection of the assignment error state than in a normal state and error-free assignment state, respectively. For example, the error speed may be reduced by at least 20%, preferably at least 50%, compared to the normal opening speed.

Alternatively or additionally, the control device may also be configured to control the optical display and/or the acoustic interface and/or the vibration module, in particular in addition to controlling the second actuator to cause the second barrier element to open. In particular, a displaying respectively outputting of a misassignment information can be caused to inform about the presence of an assignment error state.

According to a further embodiment of the gate array according to the application, the gate array may comprise at least one anti-passback module. The anti-passback module can (generally) be configured to non-open of the barrier elements (in particular all barrier elements) of the gate array upon a detection of a predetermined anti-passback condition.

In particular, in so-called ID-based systems (e.g., ticket media in the form of monthly tickets), an anti-passback module and anti-passback function, respectively, may be implemented in the gate array. The anti-passback module may be generally configured to prevent a ticket medium from being passed back after a first passage of the gate array by a first user to the other side of a gate array to a further user, who may then also use the ticket medium for passage. Accordingly, in such a system, in particular as an anti-passback condition, a specific dead time (e.g., 10 minutes) may be predetermined. This dead time starts after a (positive) validation verification of the ticket medium respectively is applied backwards to verify whether the detected ticket medium has already been used previously within the dead time at the gate array. Only after this dead time has expired this ticket medium can be used again. A previous usage attempt can therefore generally lead to a negative validation verification result, so that a corresponding access control gate remains blocked.

According to a preferred embodiment of the gate array according to the application, upon a detection of the assignment error state, the control device may be configured to control the anti-passback module such that the non-opening of the barrier elements is suppressed upon a detection of the predetermined anti-passback condition (i.e., for example, when the predetermined dead time has not yet elapsed). In other words, upon a retry in which, in particular, an error-free assignment state is detected, the anti-passback function can be suspended so that, in particular, an access control gate can be released even if the specific dead time has not yet expired. The anti-passback function and the corresponding module, respectively, is suspended despite the presence of an anti-passback condition. This is a simple way to improve user convenience without reducing security.

In a stored value system (value is stored on the ticket medium or stored in a background system for the ticket medium), according to a further embodiment, it can be checked whether an assignment error state has occurred before the charge is debited. The control device can be configured to prevent the charge from being debited if an assignment error state is detected (and in particular if it is detected that the user has not passed the gate array).

As has been described, the first sensor equipment may comprise at least one sensor module. According to a preferred embodiment of the gate array according to the application, the first sensor equipment may comprise at least one sensor module selected from the group comprising:

infrared sensor module,
ultrasonic sensor module,
radar sensor module,
lidar sensor module,
image sensor module.

Said sensor modules have been shown to be particularly reliable for detecting the presence of a user in the first access area or second access area.

According to a further embodiment of the gate array according to the application, at least one first ultrasonic sensor module may be integrated in the first gate body. At least one second ultrasonic sensor module may be integrated in the second gate body. At least one third ultrasonic sensor module may be integrated in the fourth gate body. The first ultrasonic sensor module and the second ultrasonic sensor module may be configured to detect a user in the first access area. The second ultrasonic sensor module (and/or a fourth ultrasonic module integrated in the second gate body) and the third ultrasonic sensor module may be configured to detect a user in the second access area. Preferably, one ultrasonic module may be arranged in the gate body end face region of the gate body. By providing two ultrasonic modules each to monitor a respective access area, the presence of a user in a respective access area can be detected even more reliably.

According to a preferred embodiment of the gate array according to the application (in particular in addition to at least one ultrasonic sensor module, but also alternatively thereto), the first sensor equipment may comprise at least one image sensor module with at least one 3D (three-dimensional) camera. Preferably, the 3D camera may be arranged above the gate array and, in particular, aligned with the at least two access areas. In particular, it may be provided that for each aisle and each aisle direction, one camera is arranged above the aisle.

The detection device may comprise at least one 3D image evaluation equipment. The 3D image evaluation equipment may be configured to detect a user at least in the second access area by evaluating the 3D image data provided by the 3D camera. The 3D image evaluation equipment may be configured to detect a user at least in the second access area and in the first access area. In particular, the 3D image evaluation equipment may determine whether users are present in the first access area and/or the second access area simultaneously. In a reliable manner, the presence of a user can be determined only in the second area (and without a user being present in the first area).

In principle, the 3D image evaluation equipment may determine in various ways the presence of a user only in the second area based on the provided 3D image data. According to a preferred embodiment of the gate array according to the application, the 3D image evaluation equipment may comprise a localization module configured to localize a user relative to the gate array. Further, the 3D image evaluation equipment may comprise a detection module configured to determine whether the located user is in the first access area or in the second access area. For example, reference image data may be used to determine which access area a user is located in. In particular, the detection module may be configured to detect an assignment error state based on the located user and a ticket medium captured by a specific reader module.

Particularly preferably, the 3D image evaluation equipment may comprise a first pre-processing module configured to extract 2D image data from the provided 3D image data. Further, the 3D image evaluation equipment may comprise at least one classification module configured to classify an object contained in the 2D image data as a user. In particular, the extracting of 2D image data and the subsequent classifying (for example, based on reference image data) enable users to be distinguished from other objects such as luggage, animals, etc.

According to a further embodiment of the gate array according to the application, the gate array may comprise a second pre-processing module. The second pre-processing module may be configured to extract depth information data from the provided 3D image data. The localization module may be configured to localize a user relative to the gate array based on an object classified as a user and on at least one depth information datum of the object classified as a user. Localizing of the user at least with respect to the first access control gate and with respect to the second access control gate may be performed in a particularly reliable manner.

Particularly preferably, the detection module and/or the classification module can comprise a gesture evaluation module configured to determine a presentation gesture of a user located in the first access area or in the second access area, wherein the presentation gesture is in particular a holding of the ticket medium by the user to the first reader module or the second reader module. In particular, by a gesture evaluation an assignment error state can reliably be detected even if there are a plurality of users in front of the gate array.

For example, a first user may be detected in the first access area and a second user may be detected in the second access area simultaneously. If a ticket medium is captured by the second reader module, the gesture evaluation module can determine whether the first user is holding the ticket medium at the first reader module (i.e., there is no assignment error state) or the second user is holding the ticket medium at the first reader module (i.e., there is an assignment error state).

An exemplary variant based on a previously described 3D camera monitoring system with 3D camera and 3D image evaluation equipment is described below. The position of the at least one 3D camera is in particular above the gate array, and the camera preferably detects the entire area in front of the gate array. From the data of the 3D camera, in a preprocessing step, first 2D (true) images are extracted by the first preprocessing module and depth information is extracted by a second preprocessing module. In the object classification by the classification module, the 2D image is processed. In particular, objects in the 2D image are detected and classified. The information where the identified object is located is an important information for downstream process steps. The classification of objects is done with the help of trained algorithms that have been taught with corresponding reference data. Furthermore, in particular based on this technology, it is possible to identify gestures and/or body positions of users. With this information and the depth information, it is possible to locate the recognized objects (with gestures and/or body position) in the area in front of the gate array. Using temporally sequential images (in particular, a provided video data stream), it is possible to track the objects in the area in front of the gate array. In the final step of the processing chain, the extracted information is evaluated by the detection module.

According to a further embodiment of the gate array according to the application, a first reader module access area may be assigned to the first reader module. A second reader module access area may be assigned to the second reader module. The first sensor equipment may be configured to detect a user in the first reader module access area or in the second reader module access area. The detection device may be configured to detect an assignment error state at least if, upon a detection of the ticket medium by the first reader module of the first access control gate, a user is detected at least almost simultaneously by the first sensor equipment only in the second access area and only in the second reader module access area. In other words, the user may be in the second access area and his (left) arm may be in the first reader module access area because he is mistakenly tapping (with his left hand) on the first reader module. The reader module access area is a kind of sensor-monitored "approach zone" for the reader module in order to be able to start the evaluation shortly before the actual tap.

A reader module access area is the area in which a user must be located in order to enable a detecting of his ticket medium (at least under normal circumstances (e.g., no use of an extension element, such as a selfie stick, or the like)) at the reader module assigned to that reader module access area. This can further increase the reliability of determining an assignment error state.

According to a further embodiment of the gate array according to the application, in order to verify whether in particular an assignment error state is correctly detected, it is proposed to implement a self-checking equipment in the gate array. In particular, the gate array may comprise at least a second sensor equipment configured to detect a passage of a user through the first access control gate and to detect a passage of a user through the second access control gate. The second sensor equipment may comprise at least one sensor module. In particular, the second sensor equipment may comprise at least one sensor module for each access control gate. Preferably, the at least one sensor module may be configured to monitor an area arranged at the level of the barrier element of an access control gate or behind the barrier element, as seen in the passage direction. The at least one sensor module may be integrated in at least one of the two gate bodies of an access control gate. Preferably, the at least one sensor module may be an infrared sensor module, such as a light barrier or a light grid. With an infrared sensor module, a passage of a user through an access control gate can be determined with high reliability. It shall be understood that in other variants of the application, the second sensor equipment may alternatively or additionally comprise at least one other sensor module (e.g., ultrasonic sensor module, camera, weight sensors, etc.).

The gate array may comprise at least one self-checking equipment having a verification module. The verification module may be configured to verify whether a detected assignment error state has been correctly detected based on a passage of a user detected by the second sensor equipment after detection of the assignment error state. In particular, it is possible to verify whether, in the case of an assignment error state and an opening of the second barrier element, the user has actually subsequently passed through the second access control gate. Similarly, the verification module can verify whether a detected assignment error-free state has been correctly detected based on a passage of a user detected by the second sensor equipment after the detection of the assignment error-free state.

In particular, the self-checking equipment may comprise at least one deactivation module configured to deactivate the monitoring system based on the verification result of the verification module. In particular, if it is determined based on the verification result of the verification module that the detection of an assignment error state and/or an error-free assignment state is not correct based on the evaluated passages, the monitoring system can be deactivated. For example, it may be provided that a specific minimum number (e.g., between 1 and 5 in a specific time period) of incorrect detections must be present. In particular, this can prevent incorrectly detected assignment error states and/or error-free assignment states from occurring due to a defect sensor module and/or due to a sensor manipulation (e.g., due to vandalism, etc.).

A further aspect of the application is a method for operating a gate array, in particular a previously described gate array, wherein the gate array comprises a first access control gate having a first gate body and a second gate body arranged adjacent to the first gate body, wherein the first gate body and the second gate body define a first aisle between a controlled area and an uncontrolled area, and having at least one first barrier element movable by at least one first actuator between an open position and a closed position, wherein the second gate body comprises at least one first reader module configured to capture a ticket medium held by a user within range of the first reader module, wherein the at least one first actuator is configured to move the first barrier element based at least on a validation verification of the detected ticket medium, wherein the gate array comprises at least one second access control gate having a third gate body and a fourth gate body arranged adjacent to the third gate body, wherein the third gate body and the fourth gate body define a second aisle between the controlled area and the uncontrolled area, and at least one second barrier element movable by at least one second actuator between an open position and a closed position, wherein the fourth gate body comprises at least one second reader module configured to capture a ticket medium held by a user within range of the second reader module, wherein the at least one second actuator is configured to move the second barrier element based at least on a validation verification of the detected ticket medium, wherein the second gate body is the third gate body of the second access control gate, the method comprising:

- detecting a user in a second access area of the second access control gate and (almost simultaneously) detecting a capturing of a ticket medium by the first reader module, and
- detecting an assignment error state at least if during the capturing of the ticket medium by the first reader module of the first access control gate a user is at least nearly simultaneously detected only in the second access area, and
- initiating at least one assignment error action upon a detecting of the assignment error state.

In particular, the method is used to monitor a gate array and to detect an assignment error state (in particular a "left-hand tapping").

A further aspect of the application is a computer program comprising instructions that cause a processor of a monitoring system of a gate array, in particular a previously described gate array, to perform the method steps of the method described above.

The computer program is in particular a monitoring computer program and can be installable in a computing device of a gate array. In particular, it serves to control a (pre-described) first sensor equipment, detection device and control device. The computer program is a software application executable by one or more processors of the gate array.

The computer program, in particular the instructions or program instructions, may be stored in a computer program product, in particular a program memory. For example, a program memory is a non-volatile memory such as a flash memory, a magnetic memory, an EEPROM memory (electrically erasable programmable read-only memory) and/or an optical memory.

In addition, a computing device of the gate array may comprise a main memory, for example a volatile or non-volatile memory, in particular a random access memory (RAM), such as a static RAM memory (SRAM), a dynamic RAM memory (DRAM), a ferroelectric RAM memory (FeRAM) and/or a magnetic RAM memory (MRAM). For example, the gate device processor may store intermediate results or the like in the main memory.

A still further aspect is a passenger transport system comprising at least one transport vehicle and at least one gate array previously described, wherein the gate array is configured to control access to the transport vehicle.

Preferably, the passenger transport system may comprise a background system. A background system, also called backend system, can comprise one or more (distributed) computing device(s) and serve in particular as a server arrangement. (Software) modules/devices executable by a processor may be installed on the background system. The background system can be communicatively connected to the at least one gate array via a (wireless and/or wired) communication network, in particular to exchange data.

In variants of the application, a device/equipment or module of the gate array may also be at least partially implemented in the background system. For example, a 3D image evaluation equipment (or the modules described) and/or a self-checking equipment (or the modules described) and/or a validation module may be at least partially implemented in the background system.

Further, the passenger transportation system may comprise at least one ticketing medium described above.

Furthermore, it is noted that a gate array according to the application is in particular not a "hands-free" gate array.

A previously described module, device, apparatus, etc., may include at least partial hardware elements (e.g., processor, memory means, etc.) and/or at least partial software elements (e.g., executable code). It should also be noted that terms such as "first"; "second", "further", etc. do not indicate an order, but are used in particular to distinguish between two elements (e.g., access area, gate body, access control gate, sensor equipment, etc.).

The features of the gate arrays, methods, computer programs and passenger transport systems can be freely combined with each other. In particular, features of the description and/or the dependent claims can be independently inventive, even by completely or partially circumventing features of the independent claims, in sole position or freely combined with each other.

BRIEF DESCRIPTION OF THE DRAWINGS

There is now a multitude of possibilities for designing and further developing the gate array according to the application, the passenger transport system according to the application, the method according to the application and the computer program according to the application. In this regard, reference is made on the one hand to the patent claims subordinate to the independent patent claims, and on the other hand to the description of embodiments in connection with the drawings. The drawings show:

Similar elements are designated below with similar reference signs. The following is an example of a passenger transport system in which a gate array according to the application can be used. It shall be understood that the following embodiments can also be transferred to other application systems or application areas in which a gate array according to the application can be used, in which an authorization of users for entering or leaving a controlled area is to be verified, such as for example at sports, cultural or leisure events.

DETAILED DESCRIPTION OF SPECIFIC EMBODIMENTS

Figure 1A:
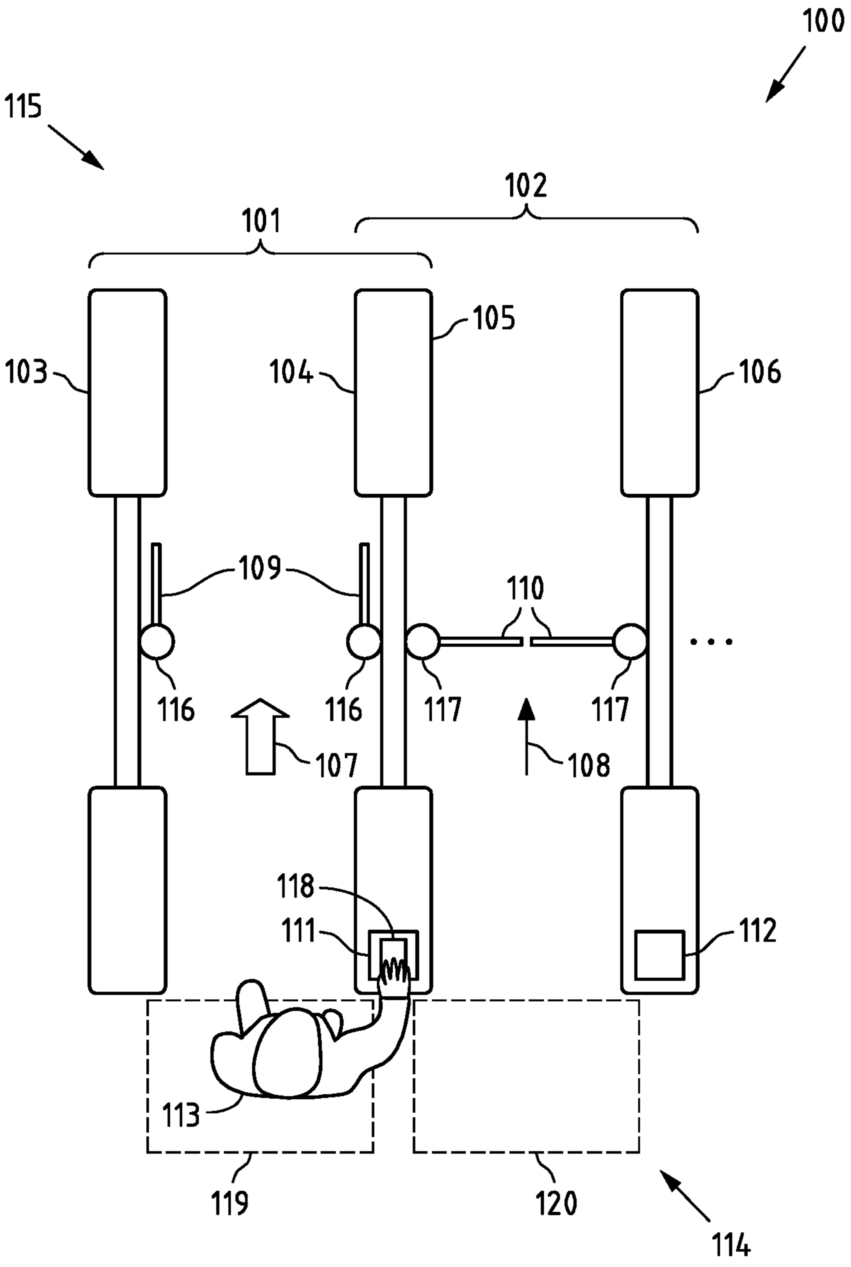
Fig.1a Prior Art
FIG. 1*a* a schematic view of an example of a prior art gate array in an error-free assignment state, FIG. 1*b* a schematic view of the example gate array of FIG. 1*a* in an assignment error state, FIG. 2*a* a schematic view of an embodiment of a passenger transport system with an embodiment of a gate array according to the present application in an error-free assignment state, FIG. 2*b* a schematic view of the embodiment of the passenger transport system according to FIG. 2*a* with the gate array in an assignment error state, FIG. 3 a schematic view of a further embodiment of a gate array according to the present application in an assignment error state, FIG. 4 a schematic view of an embodiment of a monitoring system according to the present application, and FIG. 5 a diagram of an embodiment of a method according to the present application.
Figure 1B:
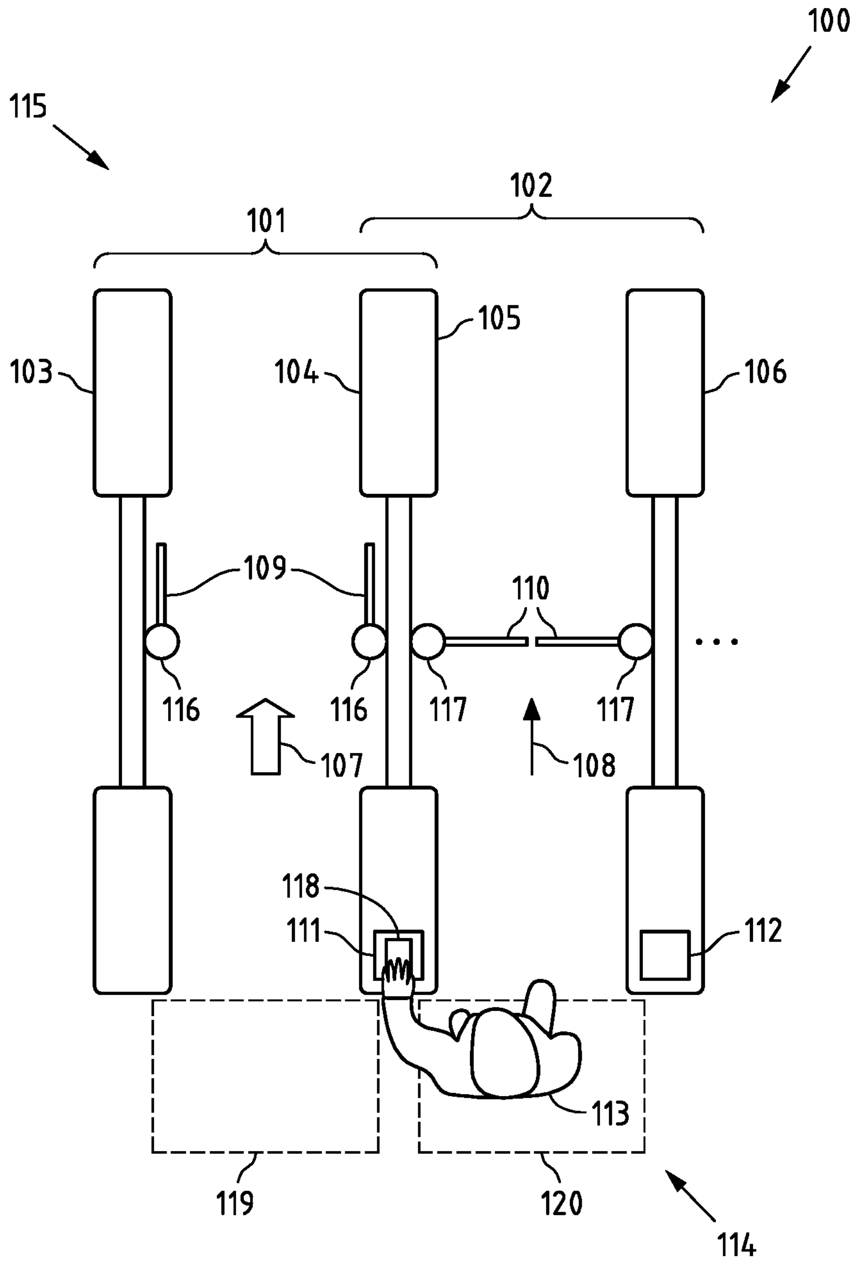
Fig.1b Prior Art
Figure 2A:
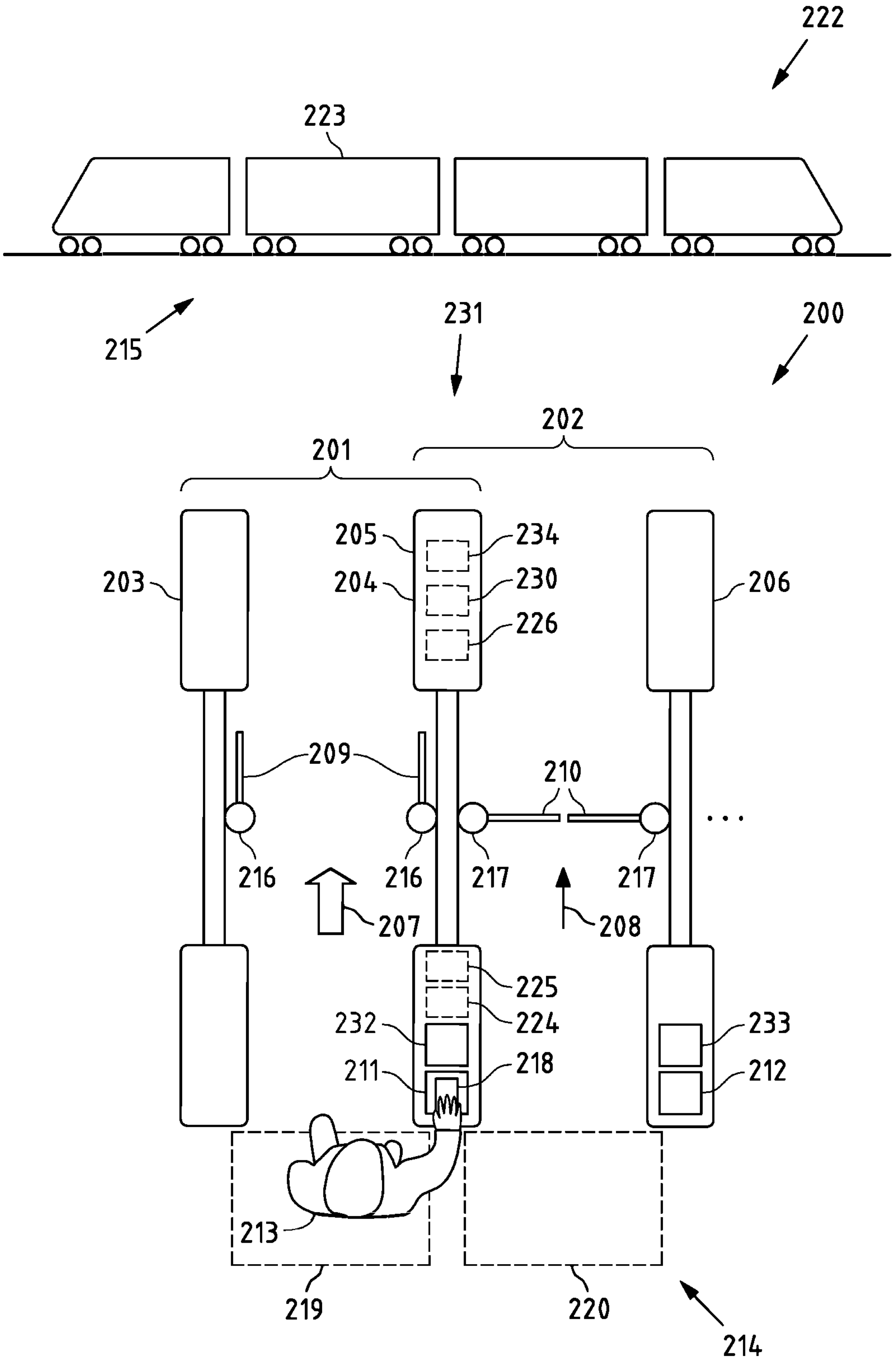

FIG. 2*a* shows a schematic view of an embodiment of a passenger transport system 222 with an embodiment of a gate array 200 according to the present application in an error-free assignment state.

The (public) passenger transport system 222 comprises at least one gate array 200, in particular a plurality of gate arrays 200. Furthermore, the passenger transport system 222 may comprise at least one transport vehicle 223, preferably a plurality of transport vehicles 223. Exemplarily, the transport vehicle 223 is shown as a rail vehicle 223. The transport vehicle 223 is disposed in a controlled area 215 of the passenger transport system 222. A use of the transport vehicle 223 respectively an entering into the controlled area 215 by a user 213 requires a valid user authorization and ticket medium 218, respectively.

The at least one gate array 200 is configured to separate an uncontrolled area 214 from the controlled area 215. In particular, this means that entering and/or leaving the controlled area 215 is controlled by the at least one gate array 200.

The shown gate array 200 comprises a first access control gate 201 and a second access control gate 202 arranged adjacent to the first access control gate 201. It shall be understood that three or more adjacent access control gates may be provided.

The first access control gate 201 comprises a first gate body 203, in particular elongated in shape, and a second gate body 204, in particular elongated in shape, arranged adjacent (in particular parallel) to the first gate body 203. The first gate body 203 and the second gate body 204 define a first aisle 207 from the controlled area 214 to the uncontrolled area 215.

Furthermore, the first access control gate 201 comprises at least one first barrier element 209. Presently, two first barrier elements 209 are each provided in the form of a pivotable door 209. The at least one first barrier element 209 is movable between an open position and a closed position by at least one first actuator 216. In particular, one actuator 216 may be provided for each first barrier element 209, in particular in the form of an electric motor 216.

In the open position, in which the at least one first barrier element 209 in FIG. 2*a* is located by way of example, the aisle 207 through the first access control gate 201 is unblocked respectively a passing is possible.

The second gate body 204 of the first access control gate 201 comprises at least one first reader module 211. The first reader module 211 is configured to capture a ticket medium 218 held by a user 213 within (reading) range of the first reader module 211. Preferably, the first reader module 211 may be an NFC reader module 211 or an optical reader module 211 (e.g., barcode scanner or QR code scanner).

As described above, the at least one first actuator 216 is configured to move the first barrier element 209 based at least on a validation verification of the captured ticket medium 218. For example, the gate array 200 may comprise a validation module 230. In other variants, a background system (not shown) of the passenger transport system 222 may comprise the validation module.

The validation module 230 may be configured to perform a validation verification. In particular, by evaluating a ticket code read from the ticket medium containing a user authorization, it can be determined whether the ticket medium is a valid ticket medium or not.

In the event of a positive validation verification result, i.e., if it has been determined that the ticket medium 218 is a valid ticket medium respectively comprises a valid access authorization, the first access control gate 201 may be released by moving the at least one first barrier element 209 to the open position, as shown in FIG. 2*a*. In the event of a negative verification result, i.e., if it is determined that the ticket medium 218 is an invalid ticket medium respectively does not comprise a valid access authorization, the first access control gate 201 may remain blocked by holding the at least one first barrier element 209 in the closed position (this situation is not shown).

The first access control gate 201 is assigned to a first access area 219 in front of the aisle 207, wherein the first access area 219 must in particular be passed by a user 213 who wishes to or will pass through the first access control gate 201.

In particular, the first access area 219 is an area in which the user 213 must be located in order to be able to hold his ticket medium 218 in the detection area of the first reader module 211 with the aim of passing through the first access control gate 201.

According to the application, it is provided that at least one monitoring system 231 is implemented in the gate array 200. The monitoring system 231 comprises a first sensor equipment 224 (merely exemplarily arranged in the second gate body 204) in particular comprising at least one (not shown) sensor module. The first sensor equipment 224 is configured to detect a user 213 in the first access area 219, i.e., the presence of the user 213 in this access area 219.

In particular, the second access control gate 202 may be formed similarly to the first access control gate 201. The second access control gate 202 comprises a third gate body 205 and a fourth gate body 206 arranged adjacent to the third gate body 205. The third gate body 205 and the fourth gate body 206 define a second aisle 208 from the uncontrolled area 214 to the controlled area 215.

Furthermore, the second access control gate 202 comprises at least one second barrier element 210. In the present case, two second barrier elements 210 are provided, in particular in the form of pivotable doors. The at least one second barrier element 210 is movable between an open position and a closed position by at least one second actuator 217 (in the present case also two second actuators 217).

In the closed position, in which the at least one second barrier element 210 in FIG. 2*a* is located by way of example, the aisle 208 through the second access control gate 202 is blocked respectively not possible.

The fourth gate body 206 comprises at least one second reader module 212 configured to capture a ticket medium 218 held by a user within (reading) range of the second reader module 212. Preferably, the second reader module 212 may be an NFC reader module 212 or an optical reader module 212 (e.g., barcode scanner or QR code scanner).

The at least one second actuator 217 is configured to move the second barrier element 210 at least based on a validation verification of the detected ticket medium 218 performed by, for example, the validation module 230. In particular, the second access control gate 202 may be released respectively remain blocked in accordance with the first access control gate.

The second access control gate 202 is assigned to a second access area 220 in front of the second aisle 208, wherein the second access area 220 must in particular be passed by a user who wishes to or will pass through the second access control gate 202. In particular, the second access area 220 is an area in which the user must be located in order to be able to hold his ticket medium 218 in the detection area of the second reader module 212 with the aim of passing through the second access control gate 202.

The first sensor equipment 224 is configured to detect a user in the second access area 220, that is, the presence of the user 213 in that access area 220. In other words, the first sensor equipment 224 can detect whether there is only one user 213 in the first access area 219 or only one user in the second access area 220 or at least one user 213 in the first access area 219 and at least one other user in the second access area 220.

Presently, it can be seen that the second gate body 204 of the first access control gate 201 is respectively forms at the same time the third gate body 205 of the second access control gate 202. In other words, two adjacent access control gates 201, 202 may in particular share one gate body.

In the error-free assignment state shown in FIG. 2*a*, the user 213 presents the ticket medium 218 to the (ticket) reader module 211 that is on the right side of the aisle 207 that the user 213 wishes to use, as viewed in the passage direction. Typically, the user 213 will present the ticket medium 218 with his right hand, as illustrated. It shall be understood that in other variants, the correct reader module may be located on the other side of an aisle in each case. In the example shown in FIG. 2*a*, the ticket medium 218 is a valid ticket medium 218 such that the at least one first barrier element 209 is opened, as shown.

An error-free assignment state exists in particular if the first reader module 211 captures a ticket medium 218 and in particular almost simultaneously a presence of the user 213 is detected (only) in the first access area 219 by first sensor equipment 224. An error-free assignment state exists in particular (also) if the second reader module 212 captures a ticket medium 218 and, in particular, almost simultaneously a presence of the user is detected (only) in the second access area 220 by the first sensor equipment 224. An error-free assignment state can optionally be detected by a detection device 225 (exemplarily arranged in the second gate body 204) of the monitoring system 231.

Figure 2B:
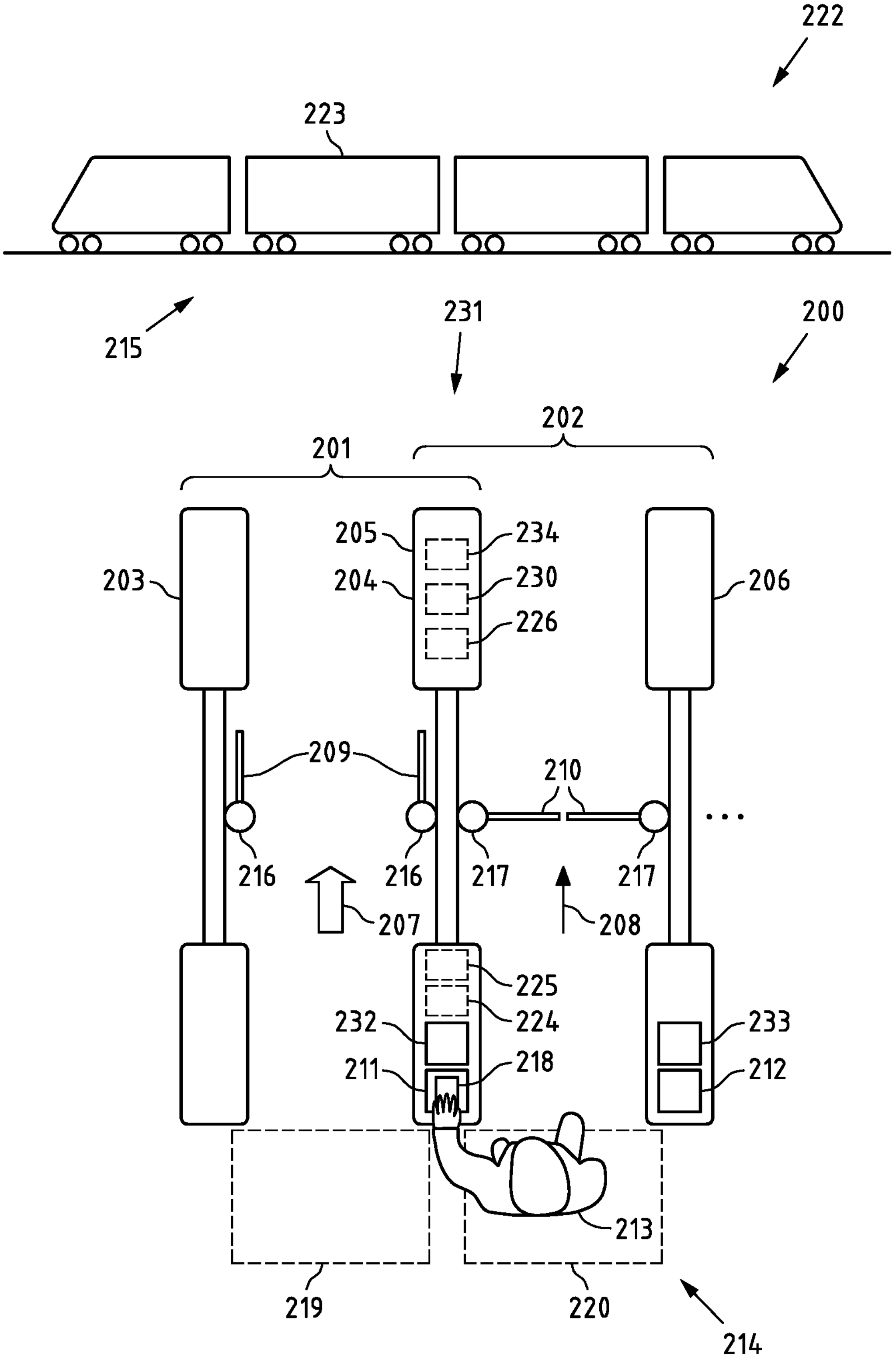

In FIG. 2*b*, a schematic (top) view of the passenger transport system 222 of FIG. 2*a* is shown with the gate array 200 in an assignment error state.

In particular, an assignment error state means that a user 213 holds his ticket medium 218 to the reader module 211, 212 that is not assigned to the access control gate 201, 202 in whose access area 219, 220 the user 213 is located during the presentation of the ticket medium 218 at the reader module 211, 212.

As illustrated herein, the user 213 presents the ticket medium 218 at the reader module 211 assigned to the first access control gate 201. However, the user 213 himself is in front of the second access control gate 202. In the example according to FIG. 2*b*, the ticket medium 218 is a valid ticket medium 218 so that the first barrier element 209 of the first access control gate 201 is/will be opened, as shown.

In particular, FIG. 2*b* illustrates a situation in which a user 213 (e.g., a left-handed person or a user 213 carrying something in his or her right hand, such as a piece of luggage) presents the ticket medium 218 to the reader module 211 and validation target 211, respectively, to which the user 213 is not directed respectively assigned with respect to the aisle 208. This situation respectively erroneous operational process may also be referred to as left-hand tapping. The expectation of the user 213 is that the barrier elements 210 of the second access control gate 202 in front of him will open. In fact, the barrier elements 209 of the first passage block 201 located to the left of the user 213 open in the shown embodiment.

According to the application, the detection device 225 is configured to detect the assignment error state. Thus, the detection device 225 is configured to detect an assignment error state at least if (for example, only if) a user 213 is detected by the first sensor equipment 224 only in the second access area 220 at least almost simultaneously when the ticket medium 218 is captured by the first reader module 211 of the first access control gate 201, as shown in FIG. 2*b*.

The monitoring system 231 comprises a control device 226 (exemplarily arranged in the second gate body 203) configured to initiate at least one assignment error action upon a detecting of the assignment error state.

Optionally, the gate array 200 may comprise at least one optical display 232, 233, in particular at least one display 232, 233. Preferably, each access control gate 201, 202 may be associated with at least one optical display 232, 233. Presently, the first access control gate 201 comprises a first optical display 232 at the second gate body 204 and the second access control gate 202 comprises a second optical display 233 at the fourth gate body 206.

In the present embodiment, initiating the assignment error action by the control device 226 comprises controlling at least one of the optical displays 232, 233 such that a graphical misassignment information is displayed on the controlled optical display 232, 233. In particular, the control device 226 may be configured to determine the display 232, 233 to be controlled based on the detected presence of the user 213 in one of the access areas 219, 220. If a user 213 is detected in the second access area 220, as shown in FIG. 2*b*, (only) the second optical display 233 may be controlled by the control device 226 to cause displaying of the misassignment information. For example, the misassignment information may be an information piece indicating the presence of an assignment error state and an instruction for the user 213 to take action to eliminate the assignment error state. For example, an arrow pointing to the opened first access control gate 201 and/or, in particular, text instructing the user to use the first access control gate 201 may be displayed.

As has been described, in further variants of the application, the gate array may alternatively or additionally comprise at least one (not shown) acoustic interface and/or at least one (not shown) vibration module. Upon a detection of the assignment error state, the control device 226 may be configured to control the acoustic interface and/or the vibration module, as has been described.

Optionally, the gate array 200 may comprise at least one anti-passback module 234 (arranged in the second gate body 204 by way of example only) configured to not open the barrier elements 209, 210 of the gate array 200 upon a detection of a predetermined anti-passback condition. In particular, the anti-passback module 234 may detect whether a detected user authorization in the form of a (unique) user identifier (e.g., a user identifier of a ticket medium in the form of a time card, such as a monthly pass) has been used within a specific previous dead time (e.g., between 5 min and 20 min from detection of the identifier). If it is detected by the anti-passback module 234 that the anti-passback condition is met, i.e., a user identifier read from a ticket medium 218 has already been used within the specific dead time then in general the anti-passback module 234 can block the gate array 200, i.e., in particular prevent it from passing, by keeping all barrier elements 209, 211 in the closed position.

Upon a detection of the assignment error state, the control device 226 may be configured to control the anti-passback module 234 such that the non-opening of the barrier elements 209, 210 is (exceptionally) suppressed upon a detection of the predetermined anti-passback condition.

Figure 3:
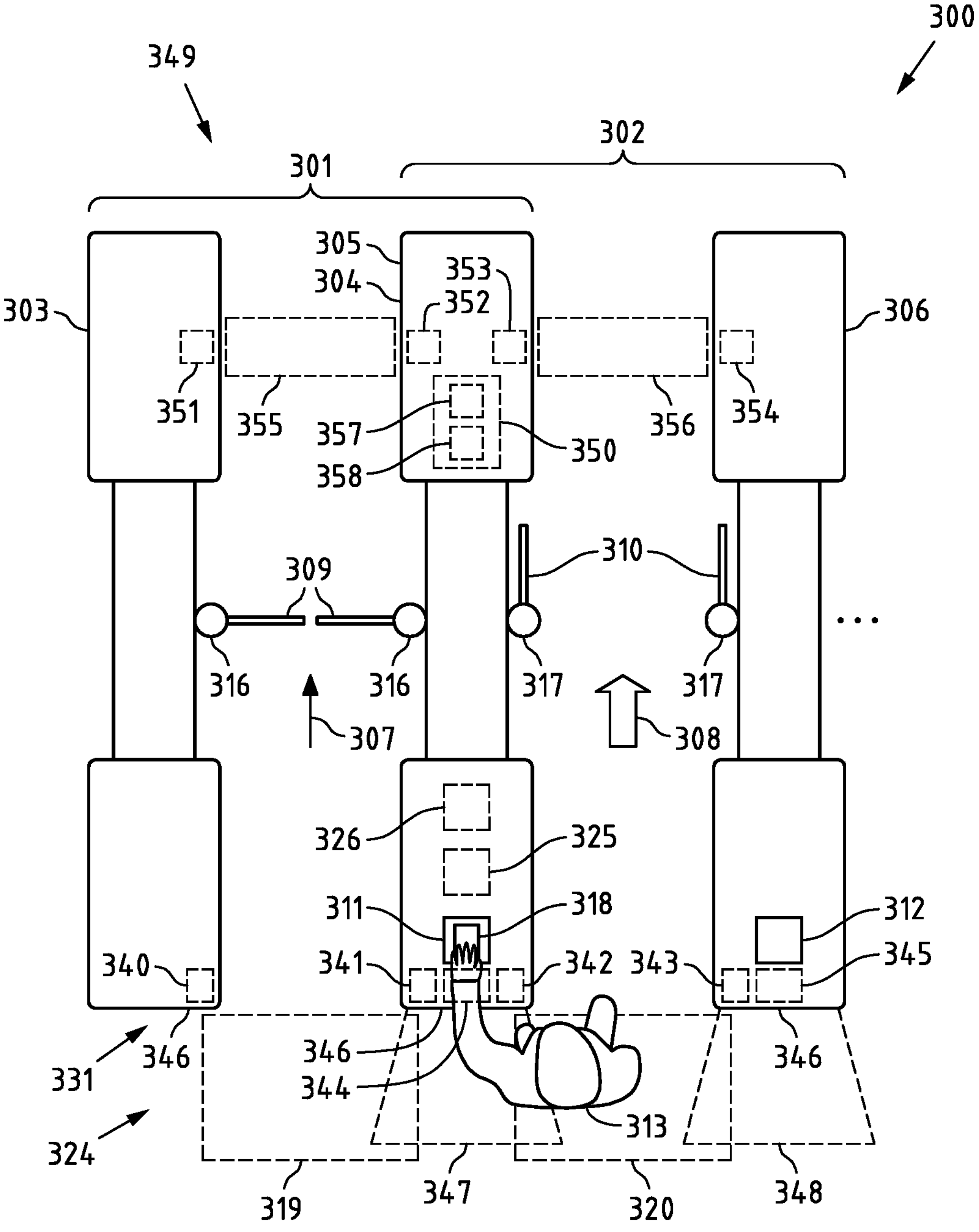

FIG. 3 shows a schematic view of a further embodiment of a gate array 300 according to the present application in an assignment error state. In order to avoid repetitions substantially only the differences from the previous embodiment are described below, and otherwise reference is made to the previous explanations.

The gate array 300 comprises two access control gates 301, 302, each having two gate bodies 303, 304, 305, 306, and a monitoring system 331 according to the application. The monitoring system 331 comprises a first sensor equipment 324, a detection device 325, and a control device 326. In the present embodiment, the first sensor equipment 324 comprises a plurality of sensor modules 340 to 345. In the present embodiment, one sensor module 340 to 345 may be an ultrasonic sensor module 340 to 345. In other variants of the application, other sensor modules may be used alternatively or additionally, as has been described.

Preferably, a first sensor module 340 integrated in the first gate body 303 and a second sensor module 341 integrated in the second gate body 304 may be configured to monitor the first access area 319. In particular, the sensor modules 340, 341 may be configured to detect a user in the first access area 319.

Preferably, a fourth sensor module 342 integrated in the third gate body 305 and a third sensor module 343 integrated in the fourth gate body 306 may be configured to monitor the second access area 320. In particular, the sensor modules 342, 343 may be configured to detect a user 313 in the second access area 320.

Optionally, a first reader module access area 347 may be associated with the first reader module 311 and a second reader module access area 348 may be associated with the second reader module 312. A fifth sensor module 344 of the first sensor equipment 324 may be configured to sense respectively detect a user 313 in the first reader module access area 347, and a sixth sensor module 345 may be configured to sense respectively detect a user in the second reader module access area 348.

In particular, the sensor modules 340 to 345 may be configured at the respective end face 346 (viewed in the passage direction) of the respective gate body 303, 304, 305, 306. This may improve the reliability of the detection.

In particular, the detection device 325 is configured to detect an assignment error state at least if (for example, only if) a user 313 is detected only in the second access area 320 and/or only in the first reader module access area 347 by the first sensor equipment 324 at least nearly simultaneously when the ticket medium 318 is captured by the first reader module 311 of the first access control gate 301, as exemplified in FIG. 3.

In particular, the states/situations/cases mentioned in the exemplary Table 1 below may occur at the gate array 300.

TABLE 1

| | 1st access control gate | | 2nd access control gate | | |
|---|---|---|---|---|---|
| Case | 1st access area | 1st reading module access area | 2nd access area | 2nd reading module access area | detection result |
| A | occupied | occupied/Tap | Free | (dree or occupied/tap) | error-free assign. state |
| B | free | occupied/tap | occupied | free | assignment error state. |
| C | free | occupied/tap | occupied | occupied/tap | unclear -> error-free assign. state |
| D | occupied | occupied/tap | occupied | (free or occupied/tap) | unclear -> error-free assign. state |
| E | free | Occupied/Tap | free | (free or occupied/tap) | unclear -> error-free assign. State |

It should be noted that tap refers to a capturing of a ticket medium by a reader module. In case A, an error-free assignment state can be determined in an unambiguous manner, and in case B, an assignment error state can be determined in an unambiguous manner. In cases C through E, the situation and state, respectively, is ambiguous. If the situation is ambiguous, the detection device may detect an assignment error-free state. It should be noted that the information of the 2nd reader module access area in cases A, D and E can no longer change the evaluation of the situation at access control gates 1 and 2 (the 2nd reader module can also fall within the observation area for a 3rd access control gate).

As described above, the control device 326 is configured to initiate an assignment error action upon a detecting of the assignment error state. In the present embodiment, upon detecting of the assignment error state by the detection device 325, the control device 326 may control the at least one first actuator 316 such that a moving of the at least one first barrier element 309 to the open position is prevented, as shown in FIG. 3. In particular additionally, but also alternatively, upon detecting the assignment error state, the control device 326 may control the at least one second actuator 317 such that a moving of the at least one second barrier element 310 into the open position is caused, as shown in FIG. 3. Preferably, the control device 326 may cause the at least one second barrier element 310 to open at a slower speed compared to a normal opening speed.

Optionally, the gate array 300 may comprise a second sensor equipment 349 and a self-checking equipment 350. In particular, the second sensor equipment 349 is configured to detect a passage of a user through the first access control gate 301 and to detect a passage of a user 313 through the second access control gate 302. The second sensor equipment 349 may comprise a plurality of sensor modules 351, 352, 354, in particular infrared sensor modules, such as light barriers or light grids.

Preferably, a first sensor module 351 integrated in the first gate body 303 and a second sensor module 352 (for example, arranged opposite the first sensor module 351 and) integrated in the second gate body 304 may detect a passage of a user through the area 355 arranged behind the at least one first barrier element 309 (as seen in the passage direction). Further, a third sensor module 353 integrated in the third gate body 305 and a fourth sensor module 354 (for example, arranged opposite the third sensor module 353 and) integrated in the fourth gate body 306 may detect a passage of a user 313 through the area 356 arranged behind the at least one second barrier element 310 (as seen in the passage direction).

The self-checking equipment 350 (arranged in the second gate body 304 by way of example only) comprises a verification module 357 and a deactivation module 358. The verification module 357 is configured to verify whether a detected assignment error state has been correctly detected based on a passage of a user detected by the second sensor equipment 349 after the detection of the assignment error state. For example, in the present embodiment, it is possible to verify that the user 313 has actually passed through the area 356. The deactivation module 358 is configured to deactivate the monitoring system 331 based on the verification result of the verification module 357. For example, in the present case, if no passage of a user 313 through the area 356 is detected, the verification module 357 may detect an incorrect detection of an assignment error state. The monitoring system 331 may then be deactivated. Variants of the application may provide that a specific number of incorrectly detected assignment error states must be detected to cause deactivating of the monitoring system 331.

In other variants of gate arrays according to the application, the first sensor equipment may comprise at least one camera-based sensor module, in particular a 3D camera arranged above the gate array, as an alternative or in addition to the sensor modules of the first sensor equipment, for example of FIG. 3.

Figure 4:
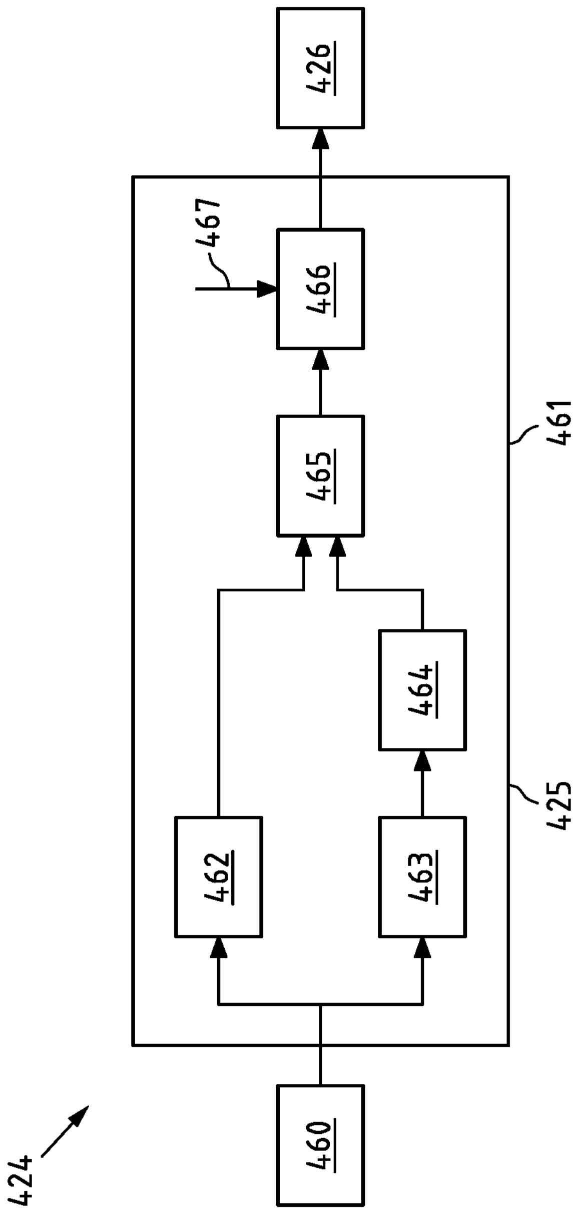

FIG. 4 shows a schematic view of an embodiment of a monitoring system according to the present application, in particular with a first sensor equipment 424 comprising at least one 3D camera 460. A gate array has not been shown for clarity. The monitoring system 431 can be used, for example, in the gate array according to FIGS. 2 and/or 3.

In addition to the first sensor equipment 424, the monitoring system comprises a detection device 425 and a control device 426 (described above). The detection device 425 comprises a 3D image evaluation equipment 461 respectively is formed by the 3D image evaluation equipment 461, which is in particular configured to detect the presence of a user at least in the second access area by evaluating the 3D image data provided by the 3D camera 460.

The 3D image data (in particular 3D video data) generated by the 3D camera 460 is provided to a first pre-processing module 463 and a second pre-processing module 462. The second pre-processing module 462 may be configured to extract depth information data from the provided 3D image data. This depth information data may be provided to a localization module 465, which may be configured to locate a user relative to the gate array.

The first pre-processing module 463 may be configured to extract 2D image data from the provided 3D image data. The extracted 2D (true) image data may be provided to a classification module 464. The classification module 464 (for example, formed by a trained algorithm as has been described) may be configured to classify an object contained in the 2D image data as a user. Preferably, the classification module 464 (in particular, a not shown gesture evaluation module of the classification module 464) may be configured to classify a gesture of the user as a tap gesture respectively a presentation gesture. Such a gesture is in particular a holding of the ticket medium by the user to a reader module.

The classification information data may be passed from the classification module 464 to the localization module 465. The localization module 465 may be configured to localize a user relative to the gate array based on an object classified as a user (in particular, a user with a presentation gesture) and at least one depth information datum of the object classified as a user.

In particular, the detection module 466 may be configured to detect an assignment error state if, during a capturing of the ticket medium by the first reader module (this information may be provided by the reader module to the detection module 466 via the input 467), a user is detected in the second access area by the localization module 465 at least almost simultaneously. Preferably, the detection of the assignment error state is based not only on a user detected in the second access area, but also on an evaluation of the gesture from this localized user. In particular, it can be determined whether a described presentation gesture is present for this user. In this case, an assignment error state can also be determined if a further user is simultaneously detected respectively located in the first access area.

A detected assignment error state may be communicated to the control device 426, which then initiates at least one assignment error action, for example according to FIGS. 2 and/or 3.

Figure 5:
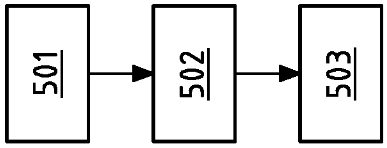

FIG. 5 shows a diagram of a method for operating a gate array, such as that described in previous embodiments.

In a first step 501, a detecting of a user in a second access area of the second access control gate and a (nearly simultaneous) detecting of a capturing of a ticket medium by the first reader module occur, as has been described.

In a step 502, a detecting an assignment error state occurs at least if, upon the detected capturing of the ticket medium by the first reader module of the first access control gate, a user is detected at least almost simultaneously only in the second access area, as has been described.

In a step 503, an initiating of at least one assignment error action occurs upon a detecting of the assignment error state, as has been described.

LIST OF REFERENCE SIGNS

100 gate array
101 first access control gate
102 second access control gate
103 first gate body
104 second gate body
105 third gate body
106 fourth gate body
107 first aisle
108 second aisle
109 first barrier element
110 second barrier element
111 first reader module
112 second reader module
113 user
114 uncontrolled area
115 controlled area
116 first actuator
117 second actuator
118 ticket medium
119 first access area
120 second access area
200 gate array
201 first access control gate
202 second access control gate
203 first gate body
204 second gate body
205 third gate body
206 fourth gate body
207 first aisle
208 second aisle
209 first barrier element
210 second barrier element
211 first reader module
212 second reader module
213 user
214 uncontrolled area
215 controlled area
216 first actuator
217 second actuator
218 ticket medium
219 first access area
220 second access area
222 passenger transport system
223 transport vehicle
224 first sensor equipment
225 detection device
226 control device
230 validation module
231 monitoring system
232 first display
233 second display
234 anti-passback module
300 gate array
301 first access control gate
302 second access control gate
303 first gate body
304 second gate body
305 third gate body
306 fourth gate body
309 first barrier element
310 second barrier element
311 first reader module
312 second reader module
313 user
316 first actuator
317 second actuator
318 ticket medium
319 first access area
320 second access area
324 first sensor equipment
325 detection device
326 control device
331 monitoring system
340 first sensor module
341 second sensor module
342 third sensor module
343 fourth sensor module
344 fifth sensor module
345 sixth sensor module
346 front side
347 first reader module access area
348 second reader module access area
349 second sensor equipment

350 self-checking equipment
351 first sensor module
352 second sensor module
353 third sensor module
354 fourth sensor module
355 first area
356 second area
357 verification module
358 deactivation module
424 sensor equipment
425 detection device
426 control device
431 monitoring system
460 3D camera
461 image evaluation equipment
462 second preprocessing module
463 first preprocessing module
464 classification module
465 localization module
466 detection module
467 input

What is claimed is:

1. Gate arrangement, comprising:

a first passage barrier having a first gate body and a second gate body arranged adjacent to the first gate body, wherein the first gate body and the second gate body define a first passage between a controlled area and an uncontrolled area, and having at least one first barrier element movable by at least one first actuator between an open position and a closed position, wherein the second gate body comprises at least one first reader module configured to capture a ticket medium held by a user within range of the first reader module, wherein the at least one first actuator is configured to move the first barrier element between the open position and the closed position based at least on a validation verification of the detected ticket medium, at least one second passage barrier having a third gate body and a fourth gate body arranged adjacent to the third gate body, wherein the third gate body and the fourth gate body define a second passage between the controlled area and the uncontrolled area, and having at least one second barrier element movable by at least one second actuator between an open position and a closed position, wherein the fourth gate body comprises at least one second reader module configured to capture a ticket medium held by a user within range of the second reader module, wherein the at least one second actuator is configured to move the second barrier element between the open position and the closed position based at least on a validation verification of the detected ticket medium, wherein the second gate body of the first passage barrier is the third gate body of the second passage barrier, wherein the gate arrangement further comprises a monitoring system having at least one first sensor equipment at least configured to detect a user in a first access area of the first passage barrier and to detect a user in a second access area of the second passage barrier, at least one detection device configured to detect an assignment error state at least if, upon detecting of the ticket medium by the first reader module of the first passage barrier, a user is detected at least almost simultaneously by the first sensor equipment only in the second access area, and at least one control device configured to initiate at least one assignment error action upon a detection of the assignment error state.

2. Gate arrangement according to claim 1, wherein the gate arrangement comprises at least one optical display, and upon a detection of the assignment error state, the control device is configured to control the optical display such that a graphical misassignment information is displayed on the optical display, and/or the gate arrangement comprises at least one acoustic interface, and upon a detection of the assignment error state, the control device is configured to control the acoustic interface such that an acoustic misassignment information is output by the acoustic interface, and/or the gate arrangement comprises at least one vibration module, and upon a detection of the assignment error state, the control device is configured to control the vibration module such that a haptic signal is output by the vibration module.

3. Gate arrangement according to claim 1, wherein upon a detection of the assignment error state, the control device is configured to control the first actuator such that a moving of the at least one first barrier element into the open position is prevented.

4. Gate arrangement according to claim 1, wherein upon a detection of the assignment error state, the control device is configured to control the second actuator such that a moving of the at least one second barrier element into the open position is caused.

5. Gate arrangement according to claim 1, further comprising at least one anti-passback module configured to not open the barrier elements of the gate arrangement upon a detection of a predetermined anti-passback condition, wherein upon a detection of the assignment error state, the control device is configured to control the anti-passback module such that the non-opening of the barrier elements upon a detection of the predetermined anti-passback condition is suppressed.

6. Gate arrangement according to claim 1, wherein the first sensor equipment comprises at least one sensor module selected from the group comprising:

infrared sensor, ultrasonic sensor, radar sensor module, lidar sensor, image sensor.

7. Gate arrangement according to claim 6, wherein at least a first ultrasonic sensor is integrated in the first gate body, at least one second ultrasonic sensor is integrated in the second gate body, and at least a third ultrasonic sensor is integrated in the fourth gate body, wherein the first ultrasonic sensor and the second ultrasonic sensor are configured to detect a user in the first access area, and wherein the second ultrasonic sensor and the third ultrasonic sensor are configured to detect a user in the second access area.

8. Gate arrangement according to claim 6, wherein
the first sensor equipment comprises at least one image sensor module in the form of at least one 3D camera, and
the detection device comprises at least one 3D image evaluation equipment configured to detect a user at least in the second access area by evaluating the 3D image data provided by the 3D camera.

9. Gate arrangement according to claim 8, wherein the 3D image evaluation equipment is further:
configured to locate a user relative to the gate arrangement, and
to determine whether the located user is in the first access area or in the second access area.

10. Gate arrangement according to claim 9, wherein the 3D image evaluation equipment is further:
configured to extract 2D image data from the provided 3D image data, and
to classify an object contained in the 2D image data as a user.

11. Gate arrangement according to claim 10, wherein the 3D image evaluation equipment is further
configured to extract depth information data from the provided 3D image data, and
to localize a user relative to the gate arrangement based on an object classified as a user and at least one depth information datum of the object classified as a user.

12. Gate arrangement according to claim 1, wherein
a first reader module access area is associated with the first reader module,
a second reader module access area is associated with the second reader module,
the first sensor equipment is configured to detect a user in the first reader module access area or in the second reader module access area, and
the detection device is configured to detect an assignment error state at least if, upon a capturing of the ticket medium by the first reader module of the first passage barrier, a user is detected at least almost simultaneously by the first sensor equipment only in the second access area and/or only in the first reader module access area.

13. Gate arrangement according to claim 1, wherein the gate arrangement further comprises
at least one second sensor equipment configured to detect a passage of a user through the first passage barrier and to detect a passage of a user through the second passage barrier, and
at least one self-checking equipment having a verification module configured to verify whether a detected assignment error state has been correctly detected based on a passage of a user detected by the second sensor equipment after the detection of the assignment error state.

14. Method for operating a gate arrangement, wherein the gate arrangement comprises a first passage barrier having a first gate body and a second gate body arranged adjacent to the first gate body, wherein the first gate body and the second gate body define a first passageway between a controlled area and an uncontrolled area, and at least one actuator movable between an open position and a closed position, wherein the second gate body comprises at least one first reader module configured to capture a ticket medium, wherein the at least one first actuator is configured to move the first barrier element between the open position and the closed position at least based on a validation verification of the detected ticket medium, wherein the gate arrangement comprises at least one second passage barrier having a third gate body and a fourth gate body arranged adjacent to the third gate body, wherein the third gate body and the fourth gate body define a second passageway between the controlled area and the uncontrolled area, and at least one second barrier element movable by at least one second actuator between an open position and a closed position, wherein the fourth gate body comprises at least one second reader module configured to capture a ticket medium held by a user within range of the second reader module, wherein the at least one second actuator is configured to move the second barrier element between the open position and the closed position, and wherein the at least one second actuator is configured to move the second barrier element between the open position and the closed position, at least based on a validation verification of the detected ticket medium, wherein the second gate body of the first passage barrier is the third gate body of the second passage barrier, the method comprising:
detecting a user in a second access area of the second passage barrier and detecting a capturing of a ticket medium by the first reader module, and
detecting an assignment error state at least if, upon the detected capturing of the ticket medium by the first reader module of the first passage barrier, a user is detected at least almost simultaneously only in the second access area, and
initiating at least one assignment error action upon a detection of the assignment error state.

15. A non-transitory computer readable medium storing a computer program comprising instructions causing a processor of a monitoring system of a gate arrangement to perform the method steps according to claim 14.

16. Passenger transport system, comprising
at least one transport vehicle, and
at least one gate arrangement according to claim 1,
wherein the gate arrangement is configured to control an access to the transport vehicle.

17. Gate arrangement according to claim 13, wherein the self-checking equipment comprises at least one deactivation module configured to deactivate the monitoring system based on the verification result of the verification module.

* * * * *